United States Patent
Ueda et al.

(10) Patent No.: US 11,332,022 B2
(45) Date of Patent: May 17, 2022

(54) TRAVEL CONTROL DEVICE

(71) Applicant: DENSO CORPORATION, Kariya (JP)

(72) Inventors: Kensuke Ueda, Kariya (JP); Yutaro Ito, Kariya (JP); Noriaki Ikemoto, Kariya (JP); Youhei Morimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 170 days.

(21) Appl. No.: 16/680,866

(22) Filed: Nov. 12, 2019

(65) Prior Publication Data

US 2020/0079347 A1 Mar. 12, 2020

Related U.S. Application Data

(63) Continuation of application No. PCT/JP2018/006923, filed on Feb. 26, 2018.

(30) Foreign Application Priority Data

May 9, 2017 (JP) .............................. JP2017-092741

(51) Int. Cl.
  *B60W 20/13* (2016.01)
  *B60W 40/072* (2012.01)
  (Continued)

(52) U.S. Cl.
  CPC .............. *B60L 50/16* (2019.02); *B60L 50/60* (2019.02); *B60W 10/06* (2013.01); *B60W 10/08* (2013.01);
  (Continued)

(58) Field of Classification Search
  None
  See application file for complete search history.

(56) References Cited

U.S. PATENT DOCUMENTS

| | | | |
|---|---|---|---|
| 2009/0088914 A1* | 4/2009 | Mizutani | B60W 10/119 701/22 |
| 2010/0010697 A1* | 1/2010 | Soma | B60W 50/082 701/22 |

(Continued)

FOREIGN PATENT DOCUMENTS

| | | |
|---|---|---|
| JP | 2010-013042 A | 1/2010 |
| JP | 2014-24500 A | 2/2014 |

OTHER PUBLICATIONS

May 15, 2018 International Search Report issued in International Patent Application No. PCT/JP2018/006923.

*Primary Examiner* — Todd Melton
*Assistant Examiner* — Jason R Roberson
(74) *Attorney, Agent, or Firm* — Oliff PLC

(57) ABSTRACT

A travel control device includes: a first planning unit that, in response to the automobile being predicted to enter a restricted section in which a traveling condition is restricted, plans a traveling mode satisfying the restricted traveling condition as a first traveling mode in the restricted section; a second planning unit that plans a second traveling mode in a preparation section so as to perform the first traveling mode planned by the first planning unit, the preparation section being defined as a section extending to the restricted section before the automobile enters the restricted section, the second traveling mode adjusting a value of at least one parameter related to the first traveling mode to a preparation value appropriate for the first traveling mode; a control unit that controls travel of the automobile in the preparation section so as to perform the second traveling mode planned by the second planning unit.

9 Claims, 19 Drawing Sheets

(51) Int. Cl.
*B60L 50/16* (2019.01)
*B60W 10/06* (2006.01)
*B60W 10/08* (2006.01)
*B60W 40/105* (2012.01)
*B60L 50/60* (2019.01)

(52) U.S. Cl.
CPC .......... *B60W 20/13* (2016.01); *B60W 40/072* (2013.01); *B60W 40/105* (2013.01)

(56) References Cited

U.S. PATENT DOCUMENTS

| | | | |
|---|---|---|---|
| 2010/0324796 A1* | 12/2010 | Takeuchi | F16H 61/0213 701/70 |
| 2015/0298680 A1* | 10/2015 | Matthews | B60W 10/06 701/22 |
| 2017/0066429 A1* | 3/2017 | Ogawa | B60W 10/06 |
| 2018/0065620 A1* | 3/2018 | Eo | B60W 20/15 |

* cited by examiner

TRAVEL CONTROL DEVICE

CROSS-REFERENCE TO RELATED APPLICATION

The present application is a continuation application of International Application No. PCT/JP2018/006923, filed Feb. 26, 2018, which claims priority to Japanese Patent Application No. 2017-092741 filed May 9, 2017. The contents of these applications are incorporated herein by reference in their entirety.

BACKGROUND

Technical Field

The present disclosure relates to control of travel of an automobile.

Background Art

In the prior art, while an automobile is traveling on a curved road, acceleration travel included in burn and coast control is prohibited.

SUMMARY

In the present disclosure, provided is a travel control device as the following. The travel control device including: a first planning unit that plans a traveling mode satisfying the restricted traveling condition as a first traveling mode in the restricted section; a second planning unit that plans a second traveling mode in a preparation section; and a control unit that controls travel of the automobile in the preparation section, wherein: the automobile is a hybrid car equipped with an internal combustion engine, a motor-generator, and a battery, the first planning unit selects power generation travel or EV travel as the first traveling mode in the restricted section, in accordance with a relationship between a limit value of a speed of the automobile for each of the power generation travel and the EV travel, and a restricted speed range satisfying the restricted traveling condition, the power generation travel is configured to perform, based on driving power by the internal combustion engine, a first task of travelling the automobile, and a second task of causing the motor-generator to perform power generation to thereby charge the battery, the EV travel is configured to drive, based on electrical power supplied from the battery, the motor-generator to travel the automobile while maintaining the internal combustion engine being suspended, and the at least one parameter adjusted by the second planning unit includes a speed of the automobile and a remaining capacity of the battery.

BRIEF DESCRIPTION OF THE DRAWINGS

The above object and other objects, features, and advantages of the present disclosure will be further clarified by the following detailed description with reference to the accompanying drawings, wherein.

DETAILED DESCRIPTION OF THE PREFERRED EMBODIMENTS

Figure 1:
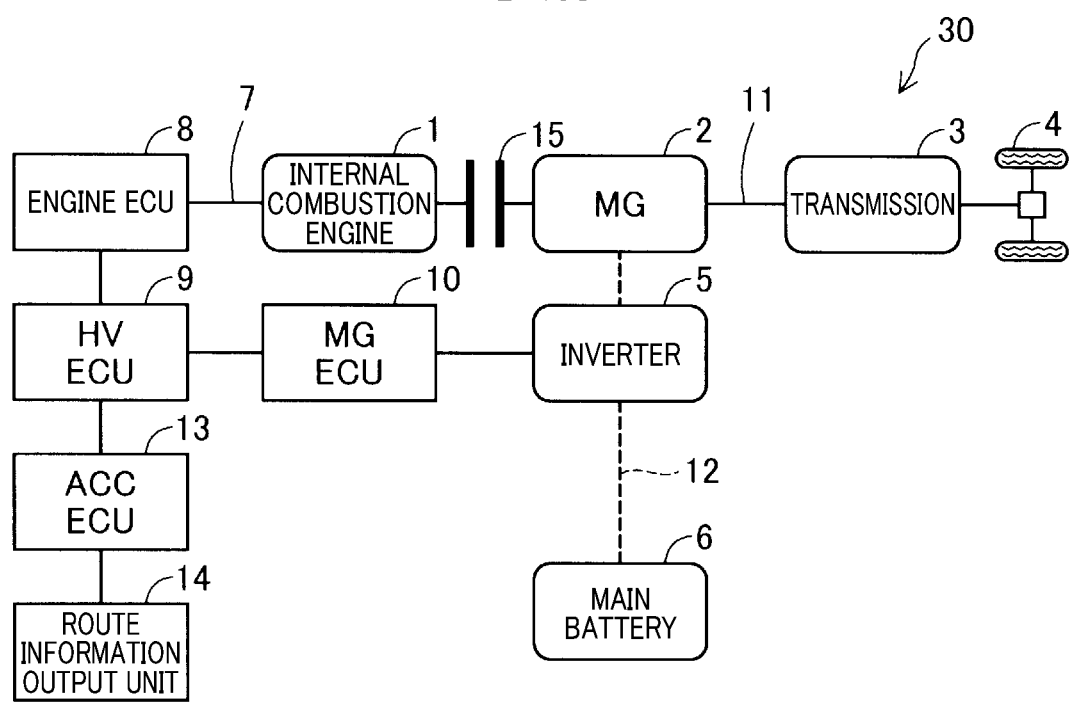
FIG. 1 is a block configuration diagram of an automobile.

Patent Literature 1 discloses that while an automobile is traveling on a curved road, acceleration travel included in burn and coast control is prohibited. The burn and coast control is control for travel in which acceleration travel and coasting travel are repeated in a range between an upper limit value of the speed of the automobile and lower limit value of the speed of the automobile set in advance. In the acceleration travel, an automobile is driven by driving force while an internal combustion engine is in an operating state. In the coasting travel, the automobile coasts while the internal combustion engine is in a non-operating state. The burn and coast control is performed to improve fuel economy.

[PTL 1] JP 2010-13042 A

According to the prior art, since acceleration is prohibited during travel on the curved road, even when travel at a higher speed improves fuel economy, acceleration is not performed and a traveling mode with poor fuel economy is maintained. The problem is not limited to when the burn and coast control is assumed, and the same also applies when other control including acceleration is assumed. The problem is not limited to the restriction that acceleration is prohibited, and the same also applies when some traveling condition is restricted. The problem is not limited to when the traveling condition is restricted during travel on the curved road, and the same also applies when the traveling condition is restricted in another situation.

A problem to be solved by the present disclosure is improvement of fuel economy during travel in a situation where some traveling condition is restricted.

An embodiment of the present invention is a travel control device for controlling travel of an automobile, the travel control device including: a first planning unit that, in response to the automobile being predicted to enter a restricted section in which a traveling condition is restricted, plans a traveling mode satisfying the restricted traveling condition as a first traveling mode in the restricted section; a second planning unit that plans a second traveling mode in a preparation section so as to perform the first traveling mode planned by the first planning unit, the preparation section being defined as a section extending to the restricted section before the automobile enters the restricted section, the second traveling mode adjusting a value of at least one parameter related to the first traveling mode to a preparation value appropriate for the first traveling mode; and a control unit that controls travel of the automobile in the preparation section so as to perform the second traveling mode planned by the second planning unit, wherein: the automobile is a hybrid car equipped with an internal combustion engine, a motor-generator, and a battery, the first planning unit selects power generation travel or EV travel as the first traveling mode in the restricted section, in accordance with a relationship between a limit value of a speed of the automobile for each of the power generation travel and the EV travel, and a restricted speed range satisfying the restricted traveling condition, the power generation travel is configured to perform, based on driving power by the internal combustion engine, a first task of travelling the automobile, and a second task of causing the motor-generator to perform power generation to thereby charge the battery, the EV travel is configured to drive, based on electrical power supplied from the battery, the motor-generator to travel the automobile while maintaining the internal combustion engine being suspended, and the at least one parameter adjusted by the second planning unit includes a speed of the automobile and a remaining capacity of the battery.

According to the embodiment, since at least one parameter related to the travel is adjusted before the automobile enters the restricted section, fuel economy in the restricted section can be improved.

A First Embodiment will be described. An automobile 30 shown in FIG. 1 is an autonomous driving vehicle at level 2 or more. Specifically, the automobile 30 has at least a function of automatically controlling acceleration and braking.

The automobile 30 is a hybrid car equipped with an internal combustion engine 1 and a motor generator (hereinafter referred to as MG) 2 as power sources. Power of an output shaft of the internal combustion engine 1 is transmitted to a transmission 3 through the MG 2. Power of an output shaft of the transmission 3 is transmitted to an output shaft 17. A mechanical connection shaft 11 transmits power of the internal combustion engine 1 to the transmission 3. A rotating shaft of the MG 2 is connected to the mechanical connection shaft 11.

The MG 2 is driven by an inverter 5. The inverter 5 is connected to a main battery 6 through an electrical connection wire 12. The MG 2 transmits electric power to and receives electric power from the main battery 6 through the inverter 5.

An engine ECU 8 controls operation of the internal combustion engine 1 by sending a signal to the internal combustion engine 1 through a signal wire 7. An MG-ECU 10 controls the inverter 5 to control the MG 2. An HV-ECU 9 transmits a control signal and a data signal to and receives a control signal and a data signal from the engine ECU 8 and the MG-ECU 10. By the transmission and reception of a control signal and a data signal, the HV-ECU 9 controls the internal combustion engine 1 and the MG 2 according to a driving state of the automobile 30.

The MG 2 is capable of converting electric power supplied from the main battery 6 into power and outputting the power to the mechanical connection shaft 11. Furthermore, the MG 2 is capable of converting power inputted from the mechanical connection shaft 11 into electric power and charging the electric power to the main battery 6. Hereinafter, the conversion of power into electric power by the MG 2 is referred to as power generation. The transmission 3 changes power inputted from the mechanical connection shaft 11 to controlled power.

The power supplied from the mechanical connection shaft 11 into the transmission 3 is power obtained by adding power of the internal combustion engine 1 to power of the MG 2, or power obtained by subtracting power for power generation from the power of the internal combustion engine 1. Hereinafter, travel using the power obtained by subtracting the power for power generation from the power of the internal combustion engine 1 is referred to as power generation travel.

In the power obtained by adding the power of the internal combustion engine 1 to the power of the MG 2, in some cases, the power of the internal combustion engine 1 or the power of the MG 2 is zero. Hereinafter, travel when the power of the MG 2 is zero, i.e., travel using only the power of the internal combustion engine 1 is referred to as normal travel. Hereinafter, travel when the power of the internal combustion engine 1 is zero, i.e., travel using only the power of the MG 2, is referred to as EV travel. During the EV travel, a clutch 15 interrupts torque transmission between the internal combustion engine 1 and the mechanical connection shaft 11.

A route information output unit 14 inputs, into an ACC-ECU 13, a current position, a curvature of a curved road, a legal speed limit, intersection information, traffic light information, information on a guidance route set by a route guidance device, and the like. The route guidance device is not shown in FIG. 1.

The ACC-ECU 13 performs burn and coast control (hereinafter referred to as BC control) by communicating with the HV-ECU 9. The BC control is control in which burn control and coasting control are repeated.

The burn control is control in which the automobile 30 is accelerated by the normal travel. In the burn control of the present embodiment, operation of the internal combustion engine 1 is controlled so that operation efficiency of the internal combustion engine 1 is in a high-efficiency condition. The high-efficiency condition of the present embodiment is defined to be in a range H shown in FIG. 2. The range H is a range close to coordinates P2 at which the efficiency is maximum. Furthermore, the burn control of the present embodiment typically requires driving force larger than at a constant vehicle speed. Accordingly, when the burn control is performed, acceleration usually occurs.

The coasting control is control causing the automobile 30 to coast. During the coasting control, the ACC-ECU 13 suspends the internal combustion engine 1 and uses the clutch 15 to interrupt torque transmission between the internal combustion engine 1 and the mechanical connection shaft 11. A vehicle speed during the coasting control is reduced due to an influence of air resistance to the automobile 30 or the like.

Figure 2:
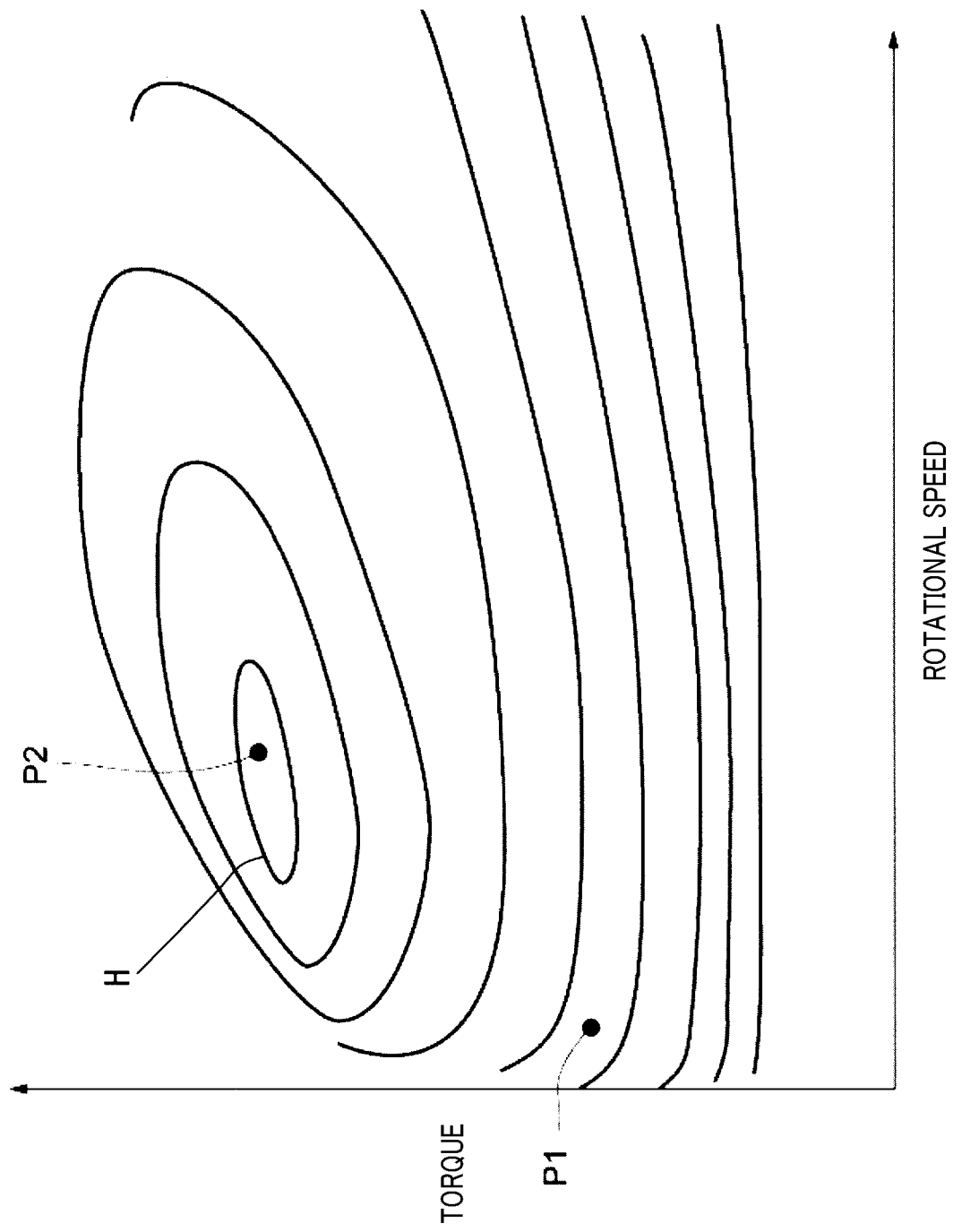
FIG. 2 is a graph showing an isogram of output in a relationship between a torque and a rotational speed of an internal combustion engine.

While driving force is generated by the internal combustion engine 1 as a result of the BC control, only operation close to the coordinates P2 shown in FIG. 2 is performed. Thus, operation close to coordinates P1 at which the efficiency is relatively low is not performed. This can consequently improve fuel economy of the automobile 30. Between a time period during which the burn control is performed and a time period during which the coasting control is performed, there may be a time period during which the vehicle speed is controlled to be constant.

When the automobile 30 travels in a restricted section, the ACC-ECU 13 restricts a traveling condition. Specifically, the ACC-ECU 13 prohibits acceleration and restricts a vehicle speed range.

The restricted section of the present embodiment is a section in which a road is curved. A time period during which the automobile 30 travels in the restricted section is referred to as restricted period. If the BC control is continued, acceleration due to the burn control occurs. Accordingly, the BC control is suspended in the restricted section.

Figure 3:
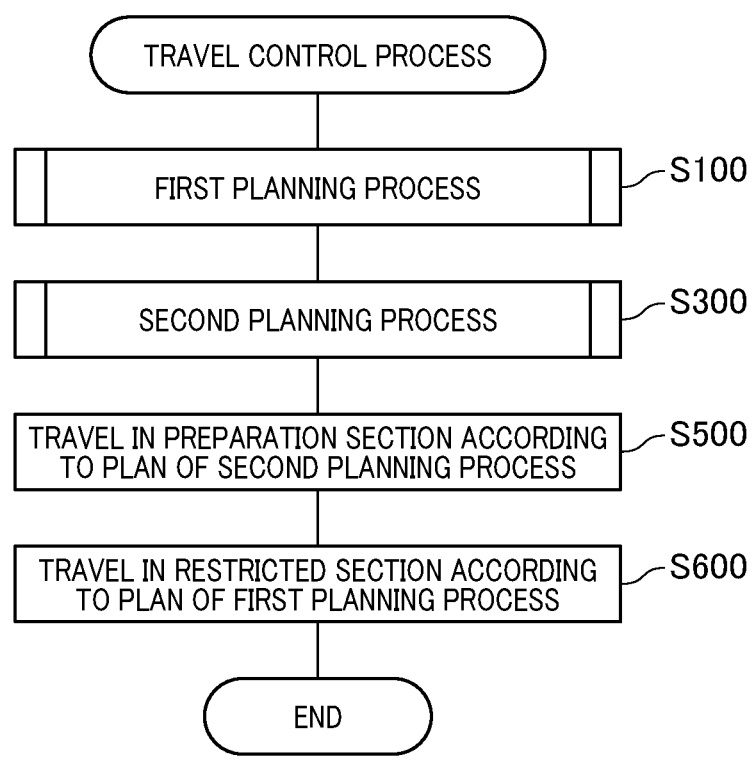
FIG. 3 is a flow chart showing a travel control process.

When the ACC-ECU 13 predicts that the automobile 30 will enter the restricted section, the ACC-ECU 13 starts a travel control process shown in FIG. 3. The ACC-ECU 13 performs the travel control process by executing a program stored in the ACC-ECU 13 itself.

When a guidance route has been set by the route guidance device, on the premise that the automobile 30 travels following the guidance route, the ACC-ECU 13 predicts entry of the automobile 30 into the restricted section. Thus, when the automobile 30 has reached a point on the guidance route at a predetermined distance before a starting point of a curved road, the ACC-ECU 13 predicts that the automobile 30 will enter the restricted section.

When no guidance route has been set by the route guidance device, on the premise that the automobile 30 travels following the road, the ACC-ECU 13 predicts entry of the automobile 30 into the restricted section. Thus, on the premise that the automobile 30 does not turn right or left, when the automobile 30 has reached a point at a predetermined distance before a starting point of a curved road, the ACC-ECU 13 predicts that the automobile 30 will enter the restricted section.

First, as S100, the ACC-ECU 13 performs a first planning process. In the first planning process, a traveling mode during travel on the curved road is planned so that fuel economy during the travel on the curved road is improved as much as possible. Specifically, the power generation travel or the EV travel is selected, and a vehicle speed is determined.

Next, as S300, the ACC-ECU 13 performs a second planning process. In the second planning process, a traveling mode in a preparation section is planned so that the traveling mode planned in the first planning process can be performed immediately after the automobile 30 enters the restricted section. The plan is made to adjust at least one parameter related to the travel. In the present embodiment, the at least one parameter related to the travel indicates the vehicle speed and an SOC. The SOC is an acronym for State Of Charge, and indicates a remaining charging capacity the main battery 6.

Next, as S500, according to the plan made in the second planning process, the ACC-ECU 13 performs control for travel in the preparation section. A time period from a time point at which the travel control process is started to a time point at which the automobile 30 enters the restricted section is referred to as a preparation period.

Lastly, control proceeds to S600, and according to the plan made in the first planning process, the ACC-ECU 13 performs control for travel in the restricted section. When the travel control process is ended, the ACC-ECU 13 resumes the BC control.

Time t0 shown in FIGS. 4 to 7 is a time point at which S100 is performed and a time point at which S500 is started. In FIGS. 4 to 7, time required to perform S100 is considered to be zero.

Figure 4:
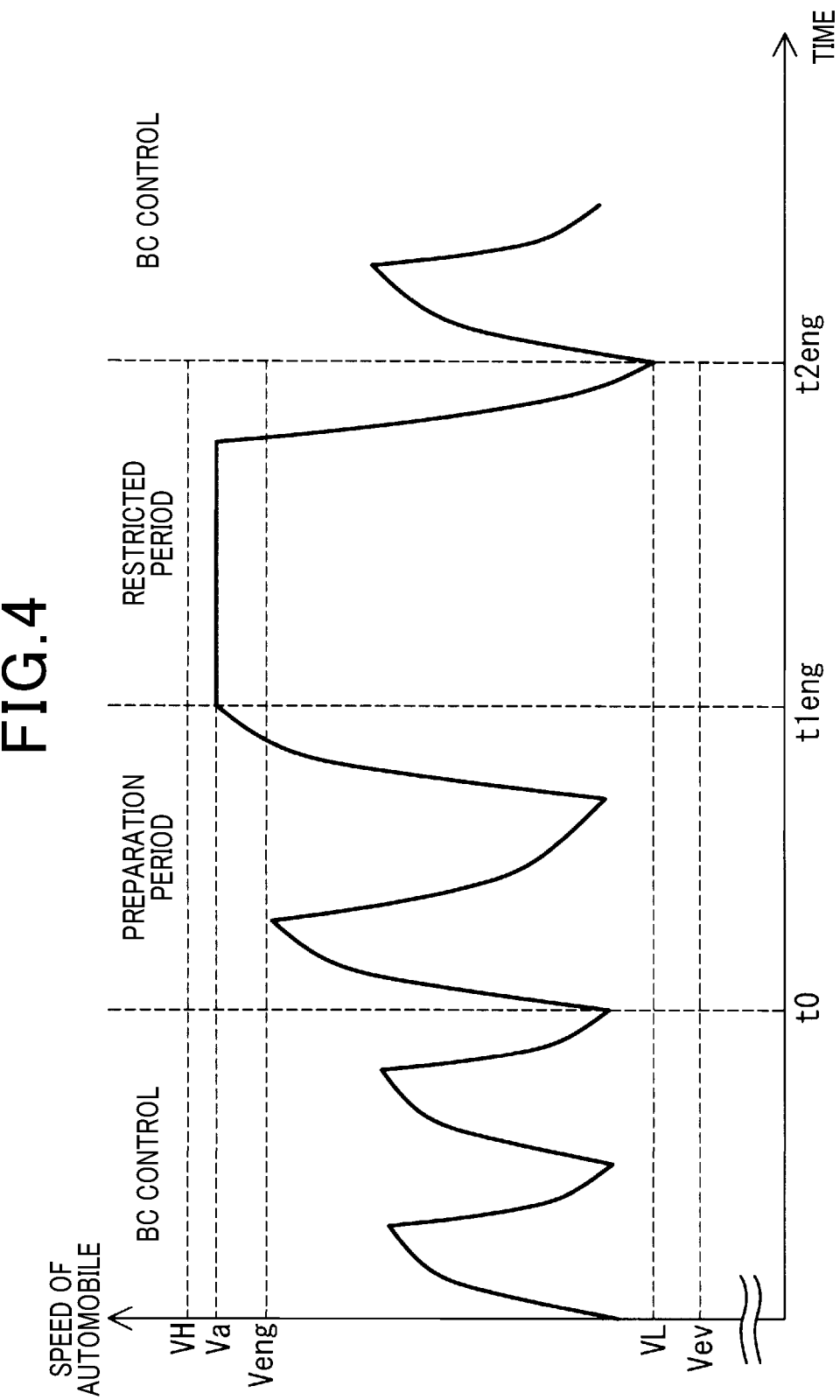
FIG. 4 is a graph showing a change in a speed of the automobile over time during power generation travel in a restricted section.
Figure 5:
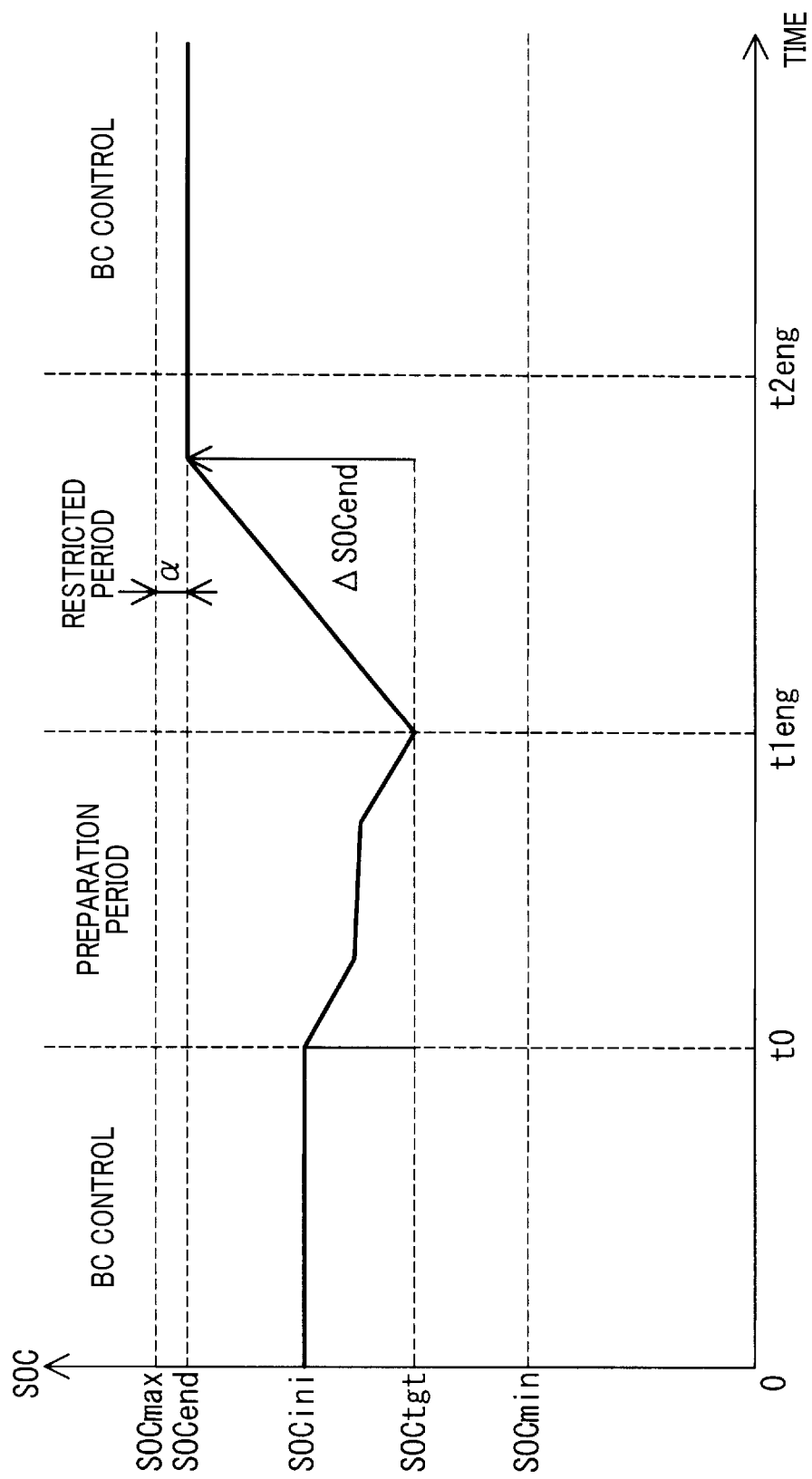
FIG. 5 is a graph showing a change in SOC over time during the power generation travel in the restricted section.
Figure 6:
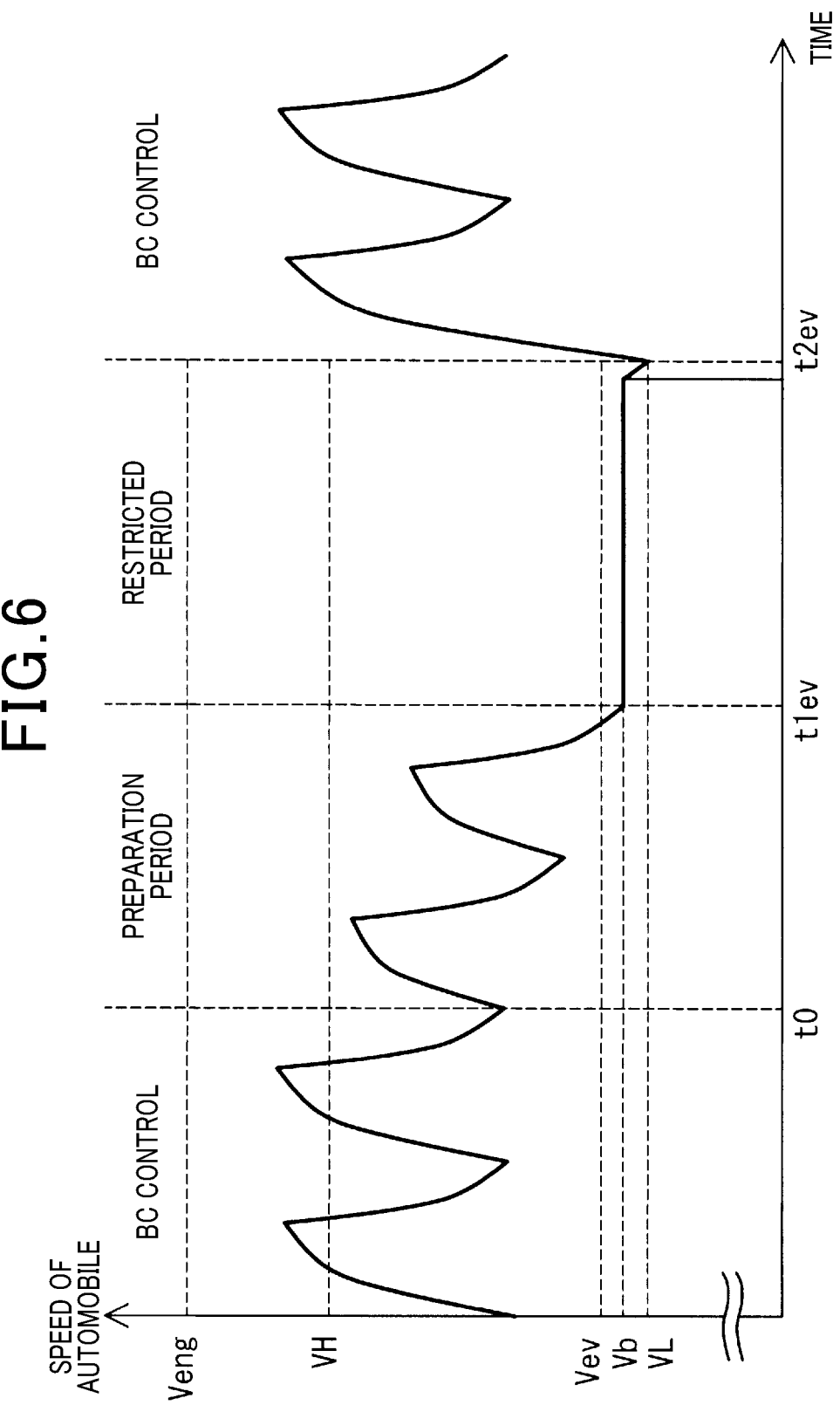
FIG. 6 is a graph showing a change in the speed of the automobile over time during EV travel in the restricted section.
Figure 7:
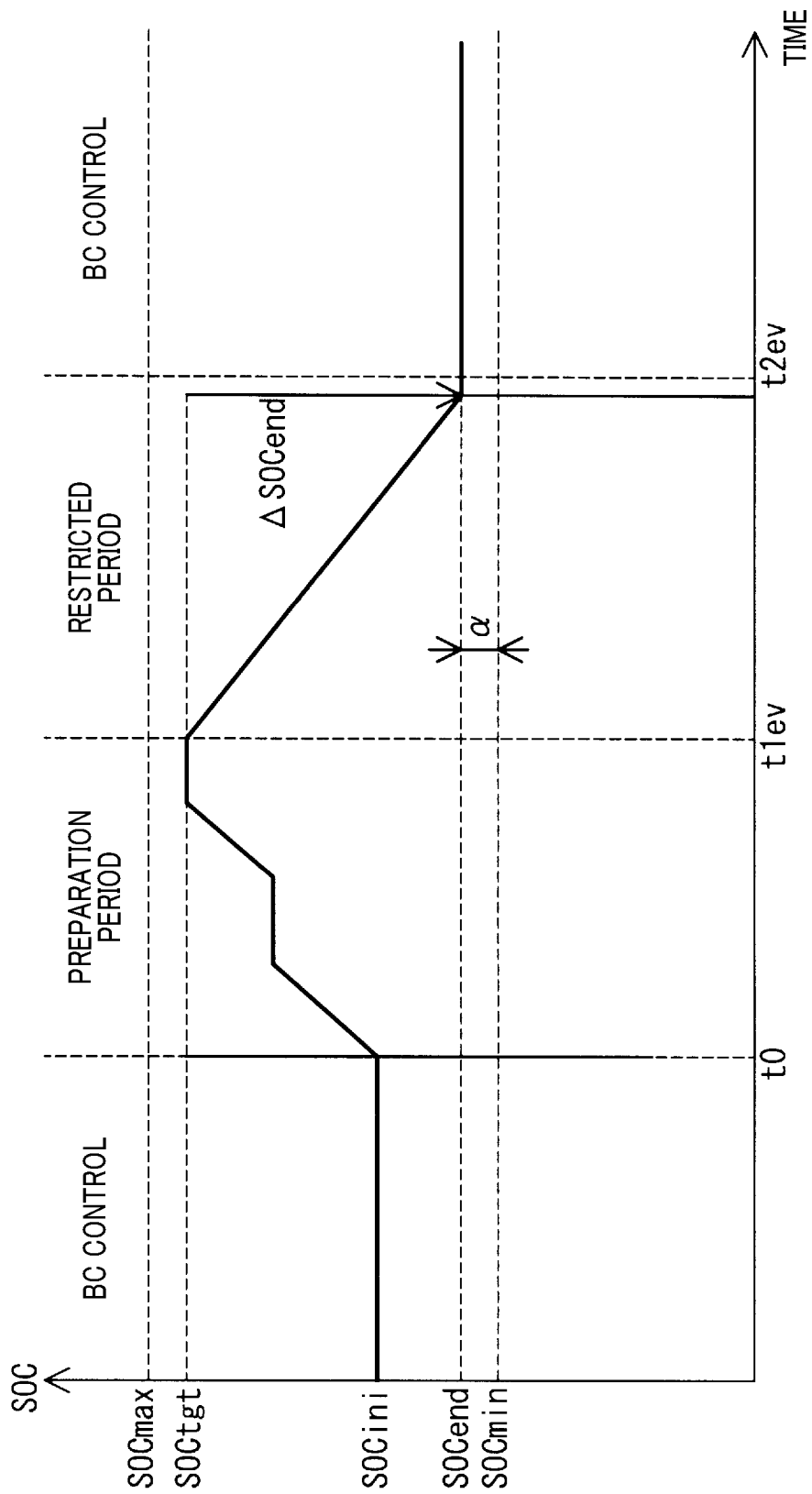
FIG. 7 is a graph showing a change in SOC over time during the EV travel in the restricted section.

Time t1eng shown in FIGS. 4 and 5 and time t1ev shown in FIGS. 6 and 7 are a time point at which S600 is started. Time t2eng shown in FIGS. 4 and 5 and time t2ev shown in FIGS. 6 and 7 are a time point at which the travel control process is ended.

Figure 8:
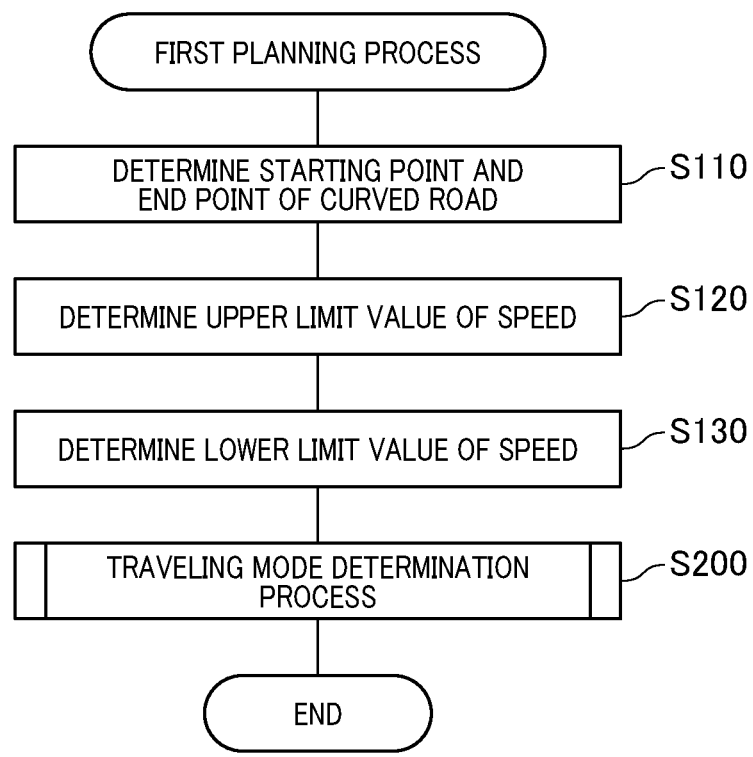
FIG. 8 is a flow chart showing a first planning process.

When the first planning process is started, as shown in FIG. 8, first, as S110, a starting point and an end point of the curved road are determined as a starting point and an end point of the restricted section. The ACC-ECU 13 performs S110 on the basis of information inputted from the route information output unit 14.

Subsequently, control proceeds to S120, and the ACC-ECU 13 determines an upper limit value of the speed of the automobile VH in the restricted section. The upper limit value of the speed of the automobile VH of the present embodiment is determined on the basis of centrifugal force during travel on the curved road and a legal speed limit. The centrifugal force during travel on the curved road is proportional to v2/r, where v represents a vehicle speed, and r represents a radius of the curve. Thus, the ACC-ECU 13 obtains the speed v such that the value v2/r is a predetermined value or less. The predetermined value has been determined in advance by examining occupant discomfort. The radius r is determined on the basis of information acquired from the route information output unit 14. The ACC-ECU 13 determines, as the upper limit value of the speed of the automobile VH, the speed v obtained in this manner or the legal speed limit, whichever is lower.

Subsequently, control proceeds to S130, and the ACC-ECU 13 determines a lower limit value of the speed of the automobile VL in the restricted section. The lower limit value of the speed of the automobile VL is determined as a speed at which the automobile 30 does not interfere with a surrounding vehicle around the automobile 30 or travels at a legal minimum speed, whichever is higher. The speed at which the automobile 30 does not interfere with a surrounding vehicle is determined on the basis of a vehicle speed of the surrounding vehicle and a travel history of the automobile 30. The ACC-ECU 13 acquires the vehicle speed of the surrounding vehicle by measurement using a sensor or a camera mounted on the automobile 30 or communication with the surrounding vehicle. Hereinafter, a speed range between the upper limit value of the speed of the automobile VH and the lower limit value of the speed of the automobile VL determined in this manner is referred to as limited range of the speed of the automobile.

Figure 9:
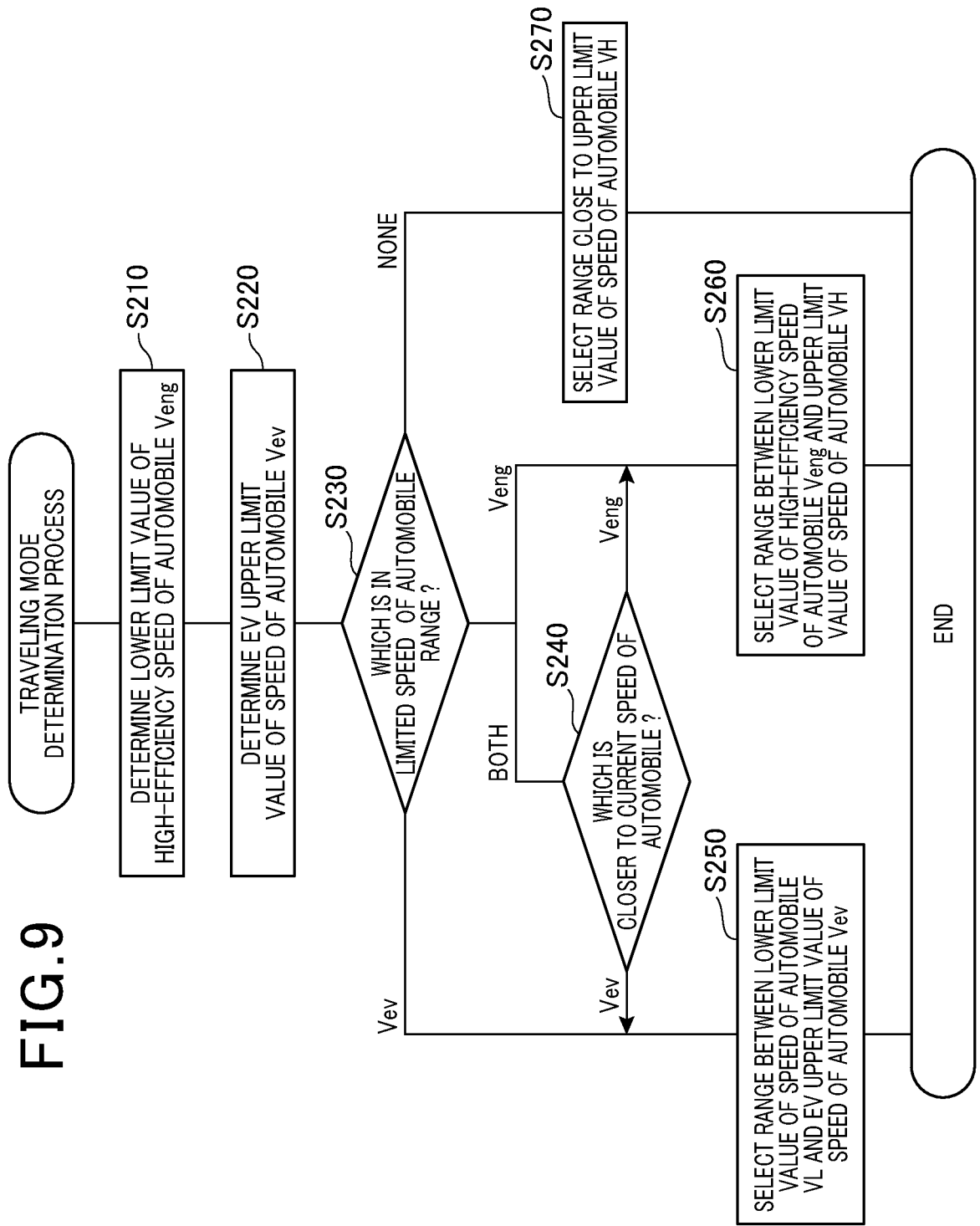
FIG. 9 is a flow chart showing a traveling mode determination process.

Subsequently, control proceeds to S200, and the ACC-ECU 13 performs a traveling mode determination process shown in FIG. 9. First, as S210, the ACC-ECU 13 determines a minimum vehicle speed (hereinafter referred to as high-efficiency lower limit value of the speed of the automobile Veng) among vehicle speeds at which high-efficiency operation of the internal combustion engine 1 is impossible. In the present embodiment, the high-efficiency operation at S210 indicates operation in the range H in FIG. 2, as with the burn control. In another embodiment, a condition different from the burn control may be used at S210.

Since acceleration is prohibited in the restricted section of the present embodiment, when the internal combustion engine 1 is operated in the restricted section, the power generation travel is performed. However, even when the power generation travel is performed, acceleration may occur. Accordingly, during the determination of the high-efficiency lower limit value of the speed of the automobile Veng, an operating condition that causes acceleration even when the power generation travel is performed is excluded from operating conditions in the range H. From the remaining operating conditions, an operating condition with the minimum vehicle speed is selected, and the vehicle speed is determined as the high-efficiency lower limit value of the speed of the automobile Veng. At S210, air resistance, road surface resistance, a steering angle, a gradient when the road in the restricted section is uphill, an ON/OFF threshold of the internal combustion engine 1, and the like may be taken into consideration.

Subsequently, control proceeds to S220, and the ACC-ECU 13 determines an upper limit value of the speed of the automobile by the EV travel (hereinafter referred to as EV upper limit value of the speed of the automobile Vev). The EV upper limit value of the speed of the automobile Vev is determined on the basis of a maximum output value of the MG 2 and a maximum output value of the main battery 6, whichever is lower. The maximum output values of the MG 2 and the main battery 6 may be treated as a fixed value or a variable value. When the maximum output value of the MG 2 is treated as a variable value, for example, the maximum output value of the MG 2 may be determined on the basis of a temperature of the MG 2. When the maximum output value of the main battery 6 is treated as a variable value, for example, the maximum output value of the main battery 6 may be determined on the basis of a temperature or an SOC of the main battery 6.

Figure 10:
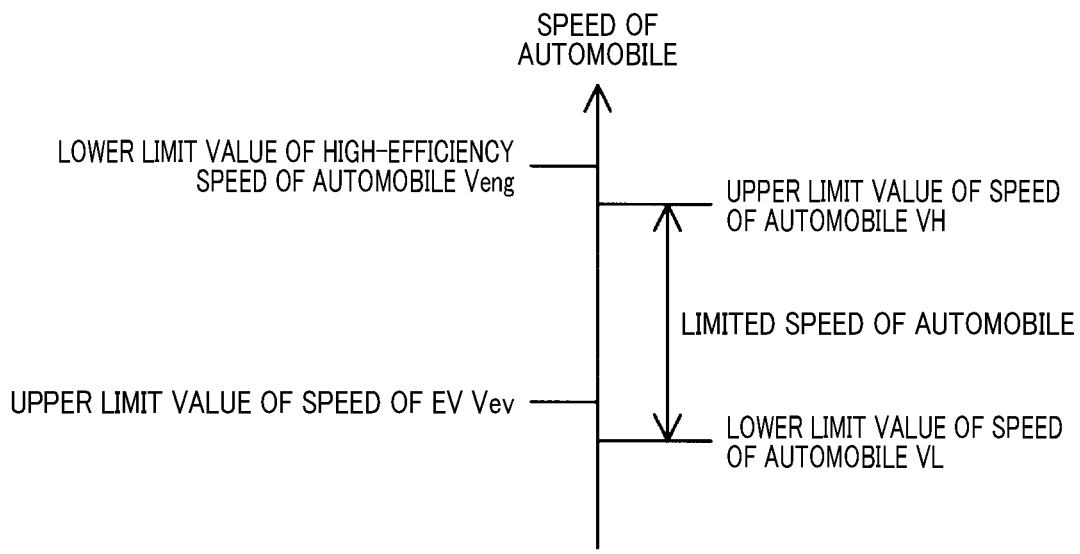
FIG. 10 shows a state where an upper limit value of the speed of EV is in a limited range of the speed of the automobile.

Subsequently, control proceeds to S230, and the ACC-ECU 13 determines which of the high-efficiency lower limit value of the speed of the automobile Veng and the EV upper limit value of the speed of the automobile Vev is in the limited range of the speed of the automobile. As shown in FIG. 10, when only the EV upper limit value of the speed of the automobile Vev is in the limited range of the speed of the automobile, control proceeds to S250, and the ACC-ECU 13 selects, as a vehicle speed at the time of entry into the restricted section, a range of the lower limit value of the speed of the automobile VL or more and the EV upper limit value of the speed of the automobile Vev or less. At the time point at which S250 is performed, the entry into the restricted section is a future event. Accordingly, even when the vehicle speed at the time of entry into the restricted section is determined as a unique value, the vehicle speed may be unachievable. Thus, at S250, the vehicle speed is determined as a range. The implementation of S250 includes selection of the EV travel as the traveling mode in the restricted section.

Figure 11:
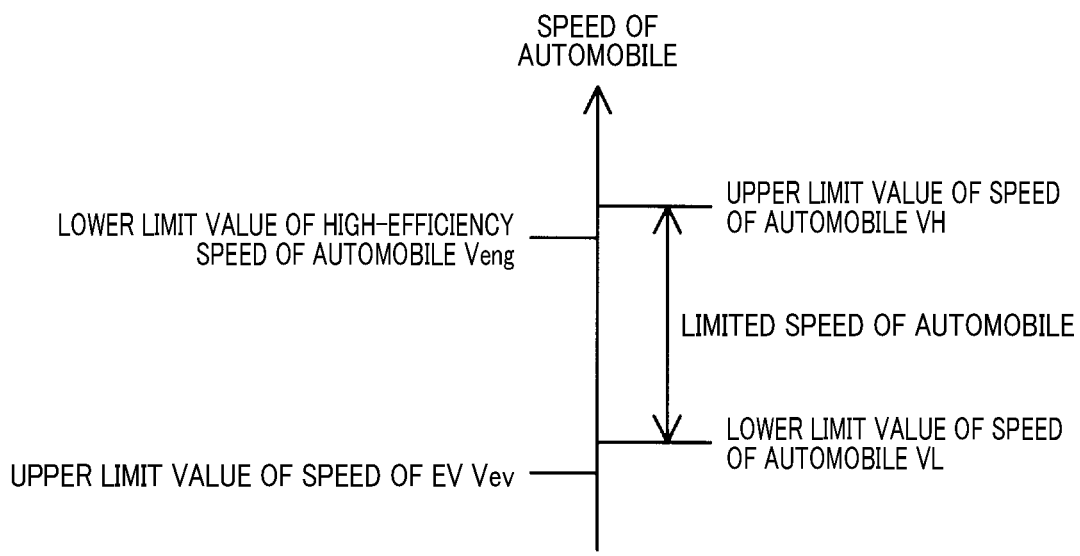
FIG. 11 shows a state where a high-efficiency lower limit speed is in the limited range of the speed of the automobile.

As shown in FIG. 11, when only the high-efficiency lower limit value of the speed of the automobile Veng is in the limited range of the speed of the automobile, control proceeds to S260, and the ACC-ECU 13 selects, as the vehicle speed at the time of entry into the restricted section, a range of the high-efficiency lower limit value of the speed of the automobile Veng or more and the upper limit value of the speed of the automobile VH or less. The implementation of S260 includes selection of the power generation travel as the traveling mode in the restricted section.

Figure 12:
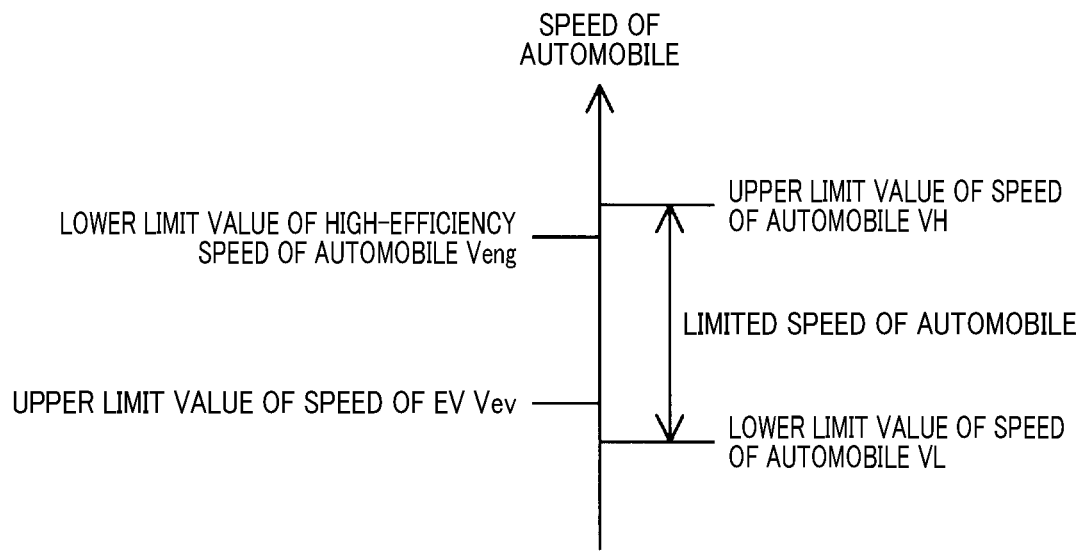
FIG. 12 shows a state where the upper limit value of the speed of EV and the high-efficiency lower limit speed are in the limited range of the speed of the automobile.
Figure 13:
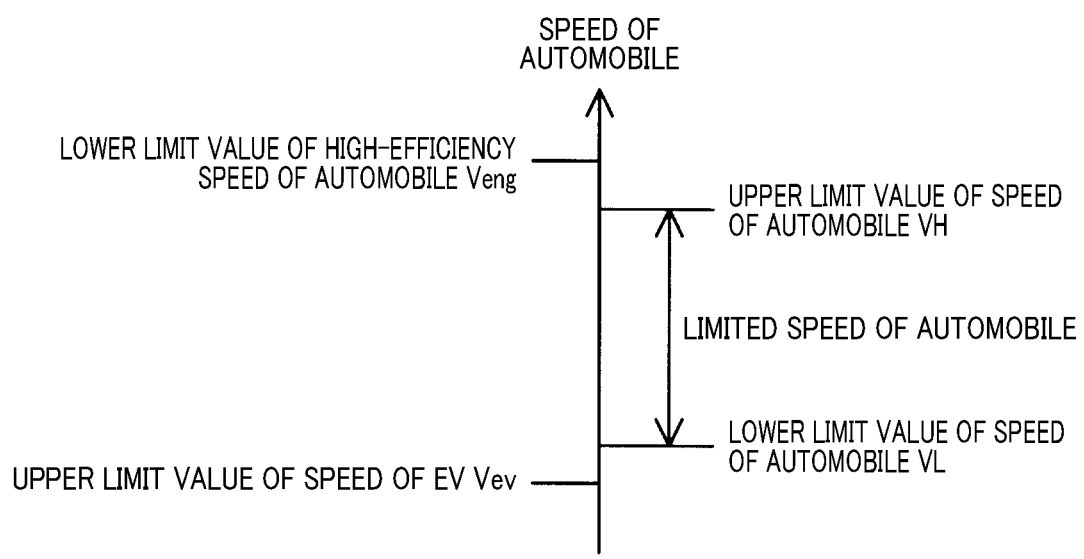
FIG. 13 shows a state where the upper limit value of the speed of EV and the high-efficiency lower limit speed are out of the limited range of the speed of the automobile.

As shown in FIG. 12, when both the high-efficiency lower limit value of the speed of the automobile Veng and the EV upper limit value of the speed of the automobile Vev are in the limited range of the speed of the automobile, control proceeds to S240, and the ACC-ECU 13 determines which of the EV upper limit value of the speed of the automobile Vev and the high-efficiency lower limit value of the speed of the automobile Veng is closer to a current vehicle speed. When the EV upper limit value of the speed of the automobile Vev is closer to the current vehicle speed, control proceeds to S250. When the high-efficiency lower limit value of the speed of the automobile Veng is closer to the current vehicle speed, control proceeds to S260. As shown in FIG. 13, when both the high-efficiency lower limit value of the speed of the automobile Veng and the EV upper limit value of the speed of the automobile Vev are out of the limited range of the speed of the automobile, control proceeds to S270, and the ACC-ECU 13 selects, as the vehicle speed at the time of entry into the restricted section, a range close to the upper limit value of the speed of the automobile VH. The range close to the upper limit value of the speed of the automobile VH is a range whose upper limit is the upper limit value of the speed of the automobile VH and whose lower limit is a vehicle speed obtained by subtracting a predetermined value from the upper limit value of the speed of the automobile VH. The implementation of S270 includes selection of the power generation travel as the traveling mode in the restricted section.

The lower limit value of the speed of the automobile by the EV travel is approximately zero km/h. In the present embodiment, therefore, the lower limit value of the speed of the automobile by the EV travel is not assumed to be higher than the upper limit value of the speed of the automobile VH. On the other hand, a maximum vehicle speed, among the vehicle speeds at which high-efficiency operation of the internal combustion engine 1 is impossible, almost always causes excessive centrifugal force during travel on the curved road. In the present embodiment, therefore, the maximum vehicle speed, among the vehicle speeds at which high-efficiency operation of the internal combustion engine 1 is possible, is not assumed to be lower than the lower limit value of the speed of the automobile VL. The content of the traveling mode determination process is determined under these assumptions.

Figure 14:
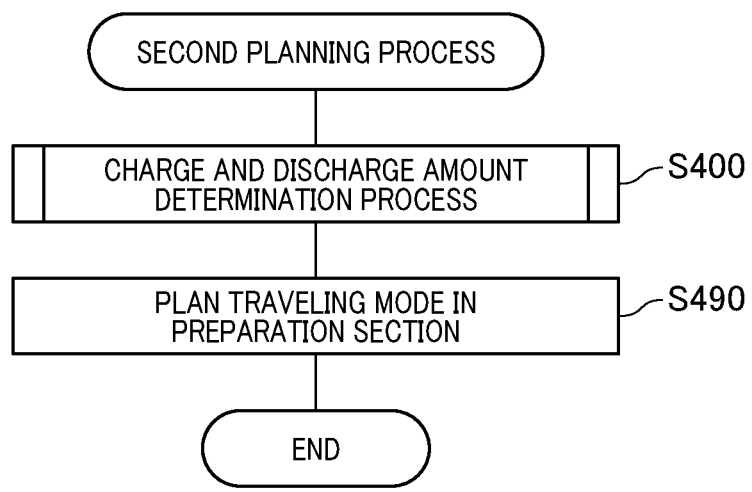
FIG. 14 is a flow chart showing a second planning process.

When the vehicle speed range is selected, as shown in FIG. 1, the ACC-ECU 13 ends the first planning process and performs the second planning process. When the second planning process is started, as shown in FIG. 14, as S400, the ACC-ECU 13 performs a charge and discharge amount determination process.

Figure 15:
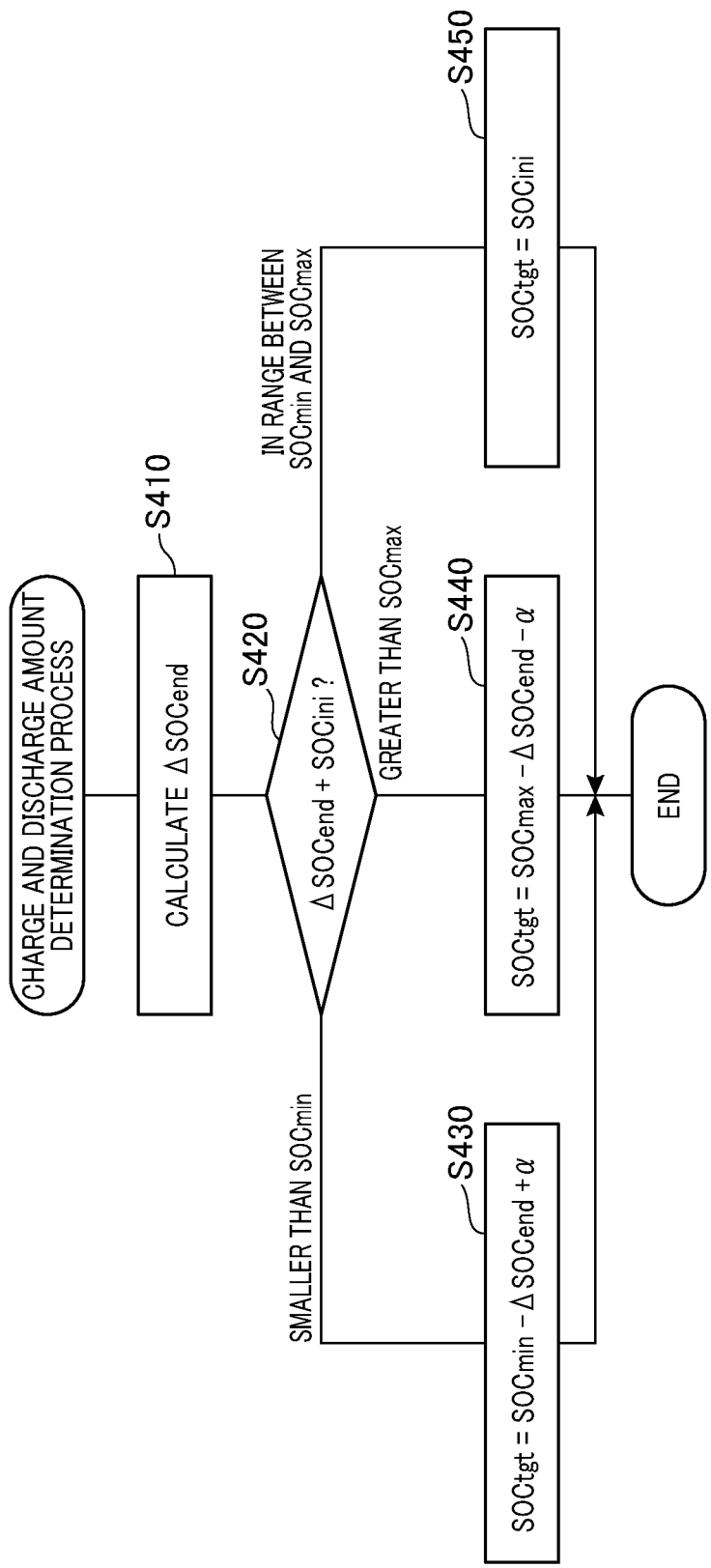
FIG. 15 is a flow chart showing a charge and discharge amount determination process.
Figure 16:
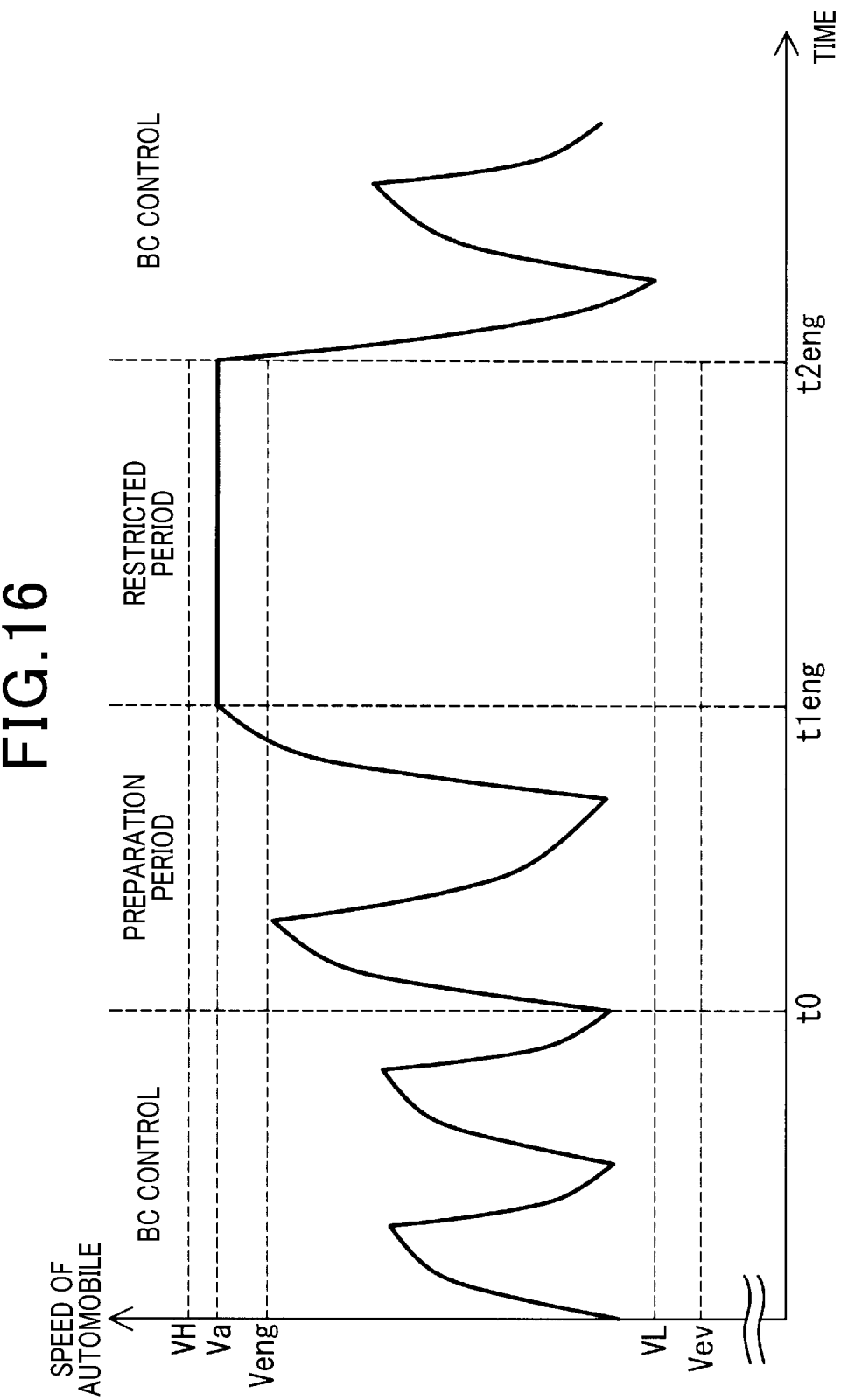
FIG. 16 is a graph showing a change in the speed of the automobile over time during power generation travel in a restricted section, of a Second Embodiment.

As shown in FIG. 15, first, as S410, the ACC-ECU 13 calculates a change amount ΔSOCend. The change amount ΔSOCend is an expected value for increase or reduction in the SOC by travel in the restricted section. The change amount ΔSOCend has a positive value or a negative value. When the power generation travel has been selected by performing S250 or S270, the change amount ΔSOCend has a positive value. When the EV travel has been selected by performing S260, the change amount ΔSOCend has a negative value.

The change amount ΔSOCend is calculated on the basis of a characteristic of the internal combustion engine 1, a characteristic of the MG 2, a distance of the restricted section, a gradient in the restricted section, or the like. In the present embodiment, in order to improve fuel economy, as shown in FIGS. 4 and 6, the coasting control is started in the middle of the restricted period. When the coasting control is started, the SOC does not change. Thus, in the calculation of the change amount ΔSOCend, a timing for starting the coasting control during the restricted period is also considered.

The timing for starting the coasting control is set to a timing as early as possible in a range satisfying a predetermined condition. The predetermined condition is a condition that allows the travel in the restricted section to be completed by the coasting travel while the vehicle speed does not become lower than the lower limit value of the speed of the automobile VL.

Next, as S420, the ACC-ECU 13 compares, with each of the value of a lower limit SOCmin and the value of an upper limit SOCmax, a value (hereinafter referred to as virtual end SOC) obtained by adding a current value SOCini to the change amount ΔSOCend. The current value SOCini is a value of the SOC at time t0. The value of the lower limit SOCmin is a value determined in advance as a lower limit value of the SOC. The value of the upper limit SOCmax is a value determined in advance as an upper limit value of the SOC.

When the virtual end SOC is in a range of the lower limit SOCmin or more and the upper limit SOCmax or less, control proceeds to S450, and the ACC-ECU 13 sets a target SOCtgt to a value equal to the current value SOCini. The target SOCtgt is a target value of the SOC at time t1eng or time t1ev. The implementation of S450 includes selection of the normal travel as the traveling mode in the preparation section in order not to change the SOC.

On the other hand, when the virtual end SOC is smaller than the lower limit SOCmin, control proceeds to S430, and the ACC-ECU 13 determines the target SOCtgt by equation (1).

$$SOCtgt = SOCmin - \Delta SOCend + \alpha \quad (1)$$

The value α, which is a positive constant, is introduced in equation (1) in order to prevent the SOC at time t2ev from being too close to the lower limit SOCmin. When control proceeds to S430, the change amount ΔSOCend has a negative value, and thus equation (2) is equivalent to equation (1).

$$SOCtgt = SOCmin + |\Delta SOCend| + \alpha \quad (2)$$

On the other hand, when the virtual end SOC is greater than the upper limit SOCmax, control proceeds to S440, and the ACC-ECU 13 determines the target SOCtgt by equation (3). When control proceeds to S440, the change amount ΔSOCend has a positive value.

$$SOCtgt = SOCmax - \Delta SOCend - \alpha \quad (3)$$

After one of S430, S440, and S450 is performed, control proceeds to S490 shown in FIG. 14, and the ACC-ECU 13 plans a traveling condition for the preparation section. Thus, since the target values of the vehicle speed and the SOC at time t1eng or time t1ev have been determined at the previous steps, the ACC-ECU 13 determines a specific traveling mode to achieve the target values.

FIGS. 4 and 5 show, as an example, a case where the power generation travel during the restricted period has been determined and the virtual end SOC is greater than the upper limit SOCmax. In this case, in the preparation period, while the SOC is appropriately reduced by generating driving force by the MG 2, the vehicle speed is adjusted so that the vehicle speed at time t1eng is in a range of the high-efficiency lower limit value of the speed of the automobile Veng or more and the upper limit value of the speed of the automobile VH or less.

FIGS. 6 and 7 show, as an example, a case where the EV travel during the restricted period has been determined and the virtual end SOC is smaller than the lower limit SOCmin. In this case, in the preparation period, while the SOC is appropriately increased by regenerative braking or the power generation travel, the vehicle speed is adjusted so that the vehicle speed at time t1ev is in a range of the EV upper limit value of the speed of the automobile Vev or more and the lower limit value of the speed of the automobile VL or less.

At time t1eng or time t1ev, the automobile 30 enters the restricted section. Thus, as S600, the ACC-ECU 13 performs control in which the traveling mode determined at the previous steps is performed.

When the power generation travel in the restricted section has been determined, as shown in FIGS. 4 and 5, a vehicle speed Va at the time of entry into the restricted section is maintained by the power generation travel, and the coasting control is started at the timing described above.

When EV travel in the restricted section has been determined, as shown in FIGS. 6 and 7, a vehicle speed Vb at the time of entry into the restricted section is maintained by the EV travel, and the coasting control is started at the timing described above. When the travel in the restricted section is ended, the travel control process is ended, and the BC control is resumed.

The first embodiment described above is highly likely to achieve preferable travel in the restricted section. The preferable travel is travel that allows good fuel economy, a legal vehicle speed, and no centrifugal force that causes discomfort. The preferable travel in the restricted section is highly likely to be achieved for the following reason. Specifically, when the automobile 30 has reached the preparation section, in the first planning process, the traveling mode in the restricted section is planned by using at least one parameter value. According to the plan, in the second planning process, the traveling mode in the preparation section preceding the restricted section is planned in advance. The traveling mode in the preparation section is planned to adjust the parameter value so that in the preparation section, the parameter value is a preparation value appropriate for the traveling mode planned in the first planning process. Then, the traveling mode in the preparation section planned in the second planning process is performed at S500.

A second embodiment will be described. The second embodiment will be described mainly focusing on differences from the first embodiment. Points not particularly described are the same as those of the first embodiment.

In the second embodiment, in addition to acceleration, deceleration is also prohibited in the restricted section. Thus, as shown in FIGS. 16 to 19, the vehicle speed is maintained constant in the restricted period. In the second embodiment, therefore, traveling stability on the curved road is improved.

Figure 17:
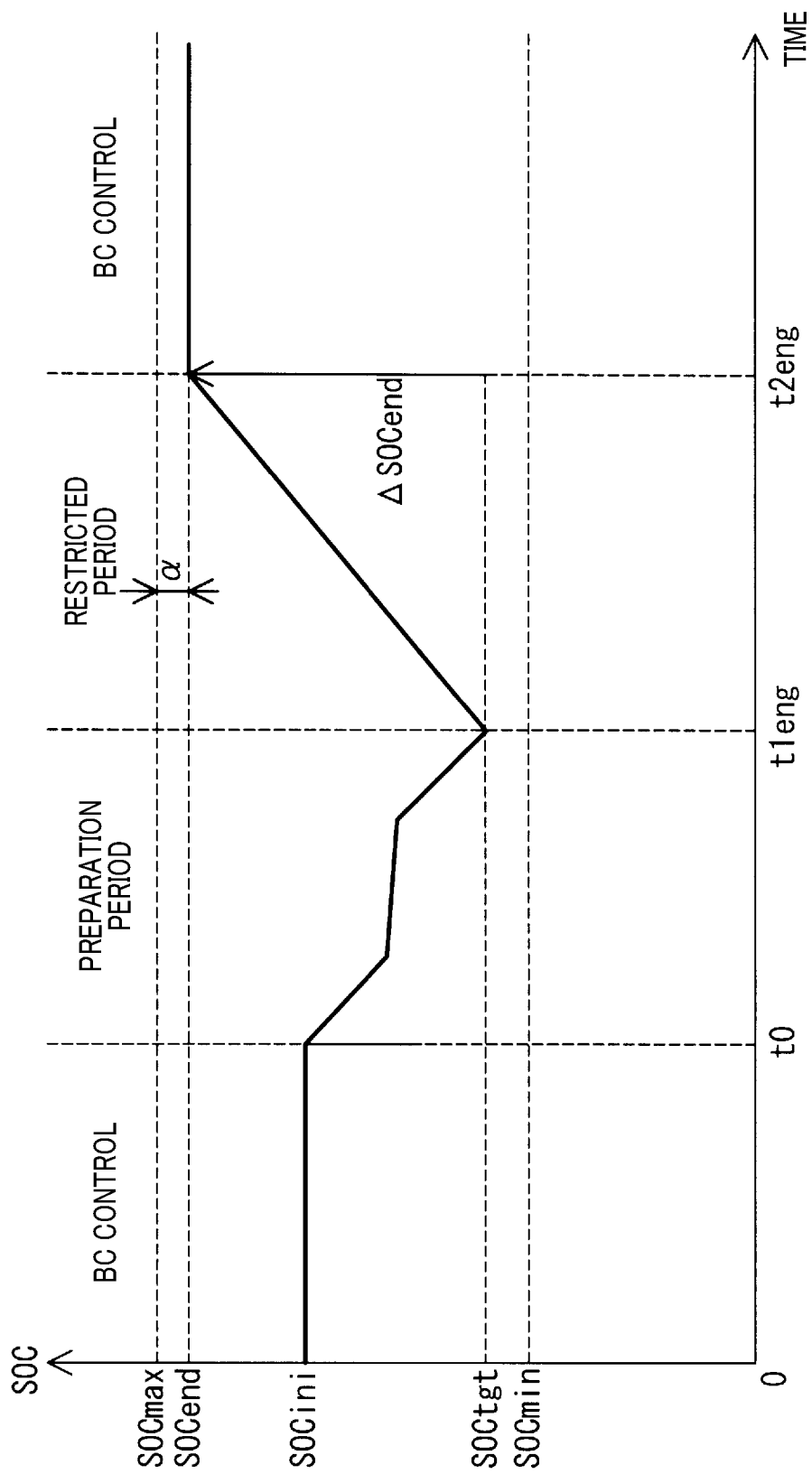
FIG. 17 is a graph showing a change in SOC over time during the power generation travel in the restricted section, of the Second Embodiment.
Figure 18:
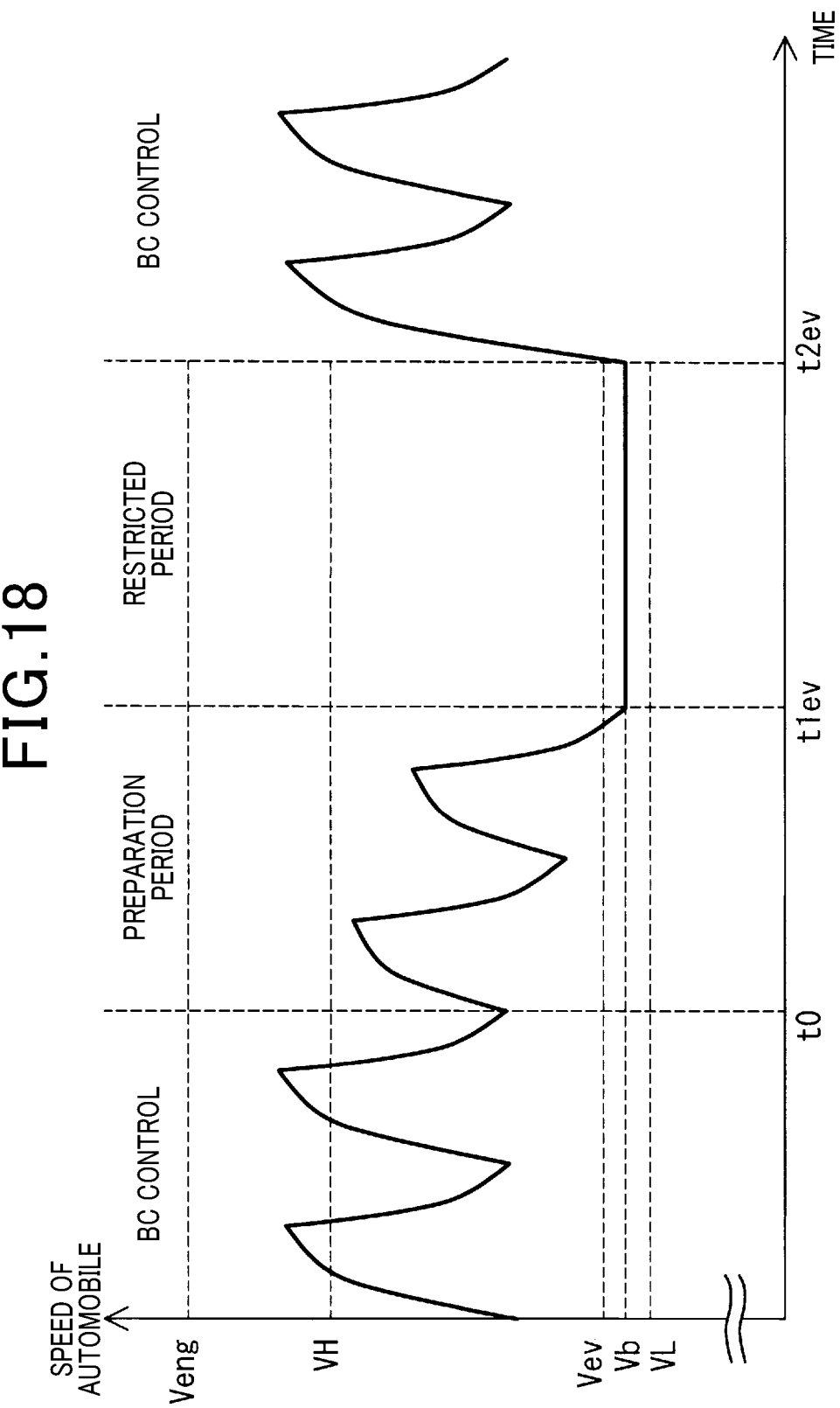
FIG. 18 is a graph showing a change in the speed of the automobile over time during EV travel in the restricted section, of the Second Embodiment.
Figure 19:
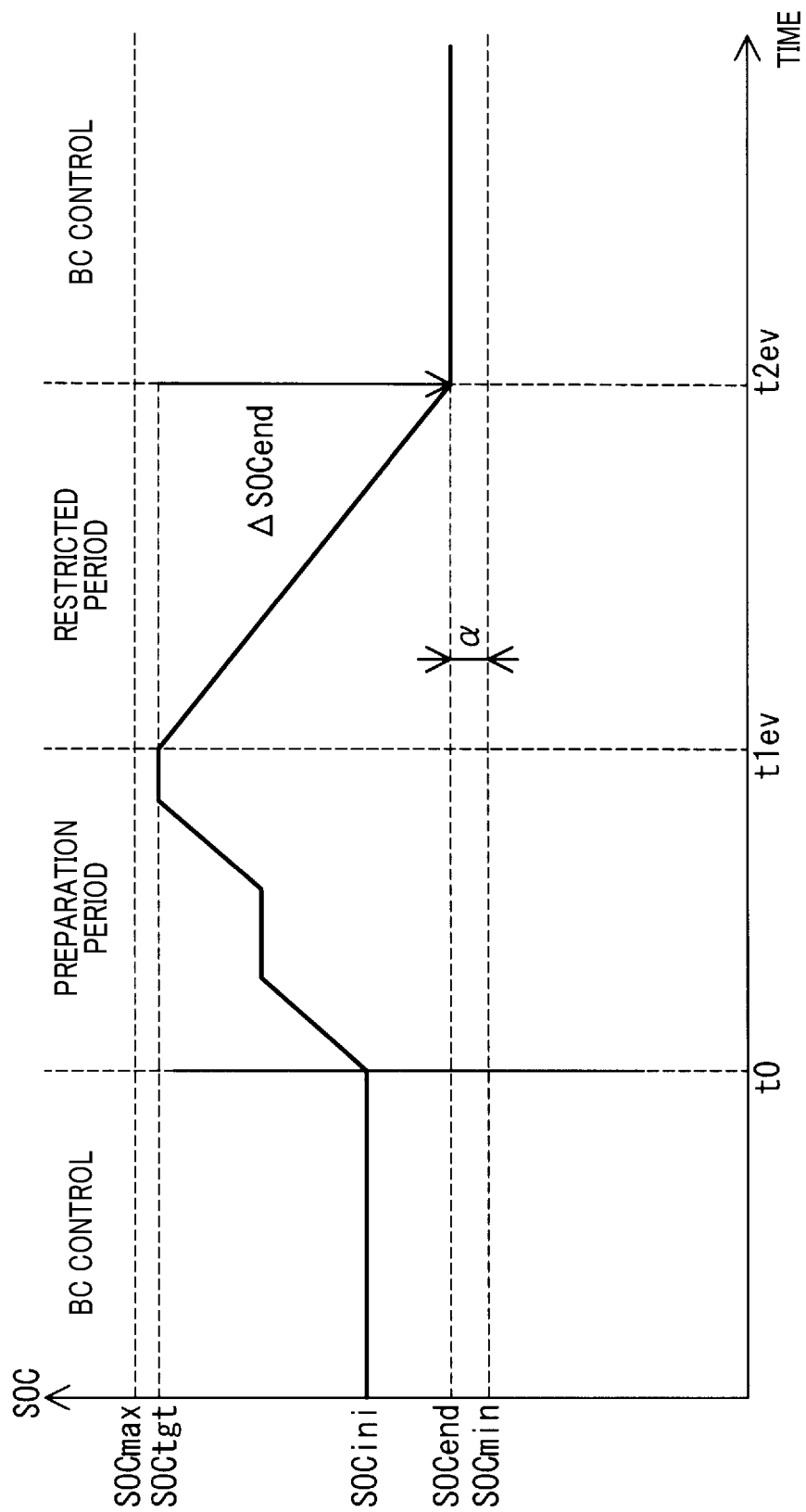
FIG. 19 is a graph showing a change in SOC over time during the EV travel in the restricted section, of the Second Embodiment.

As compared with the first embodiment, in the second embodiment, as shown in FIGS. 17 and 19, an absolute value of the change amount ΔSOCend is large. Conversely, as compared with the second embodiment, in the first embodiment, the absolute value of the change amount ΔSOCend is small, and thus the SOC in the preparation period is easily controlled.

A third embodiment will be described. The third embodiment will be described mainly focusing on differences from the first embodiment. Points not particularly described are the same as those of the first embodiment.

Figure 20:
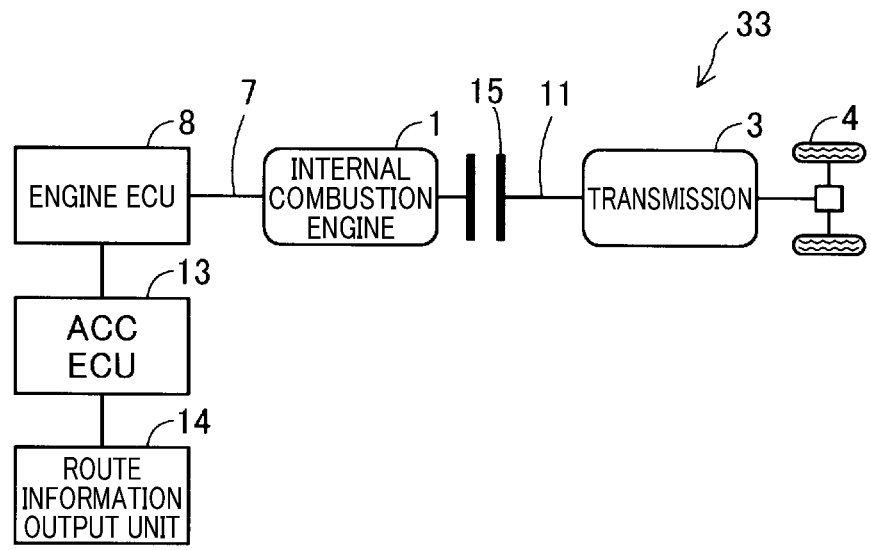
FIG. 20 is a block configuration diagram of an automobile of a Third Embodiment.
Figure 21:
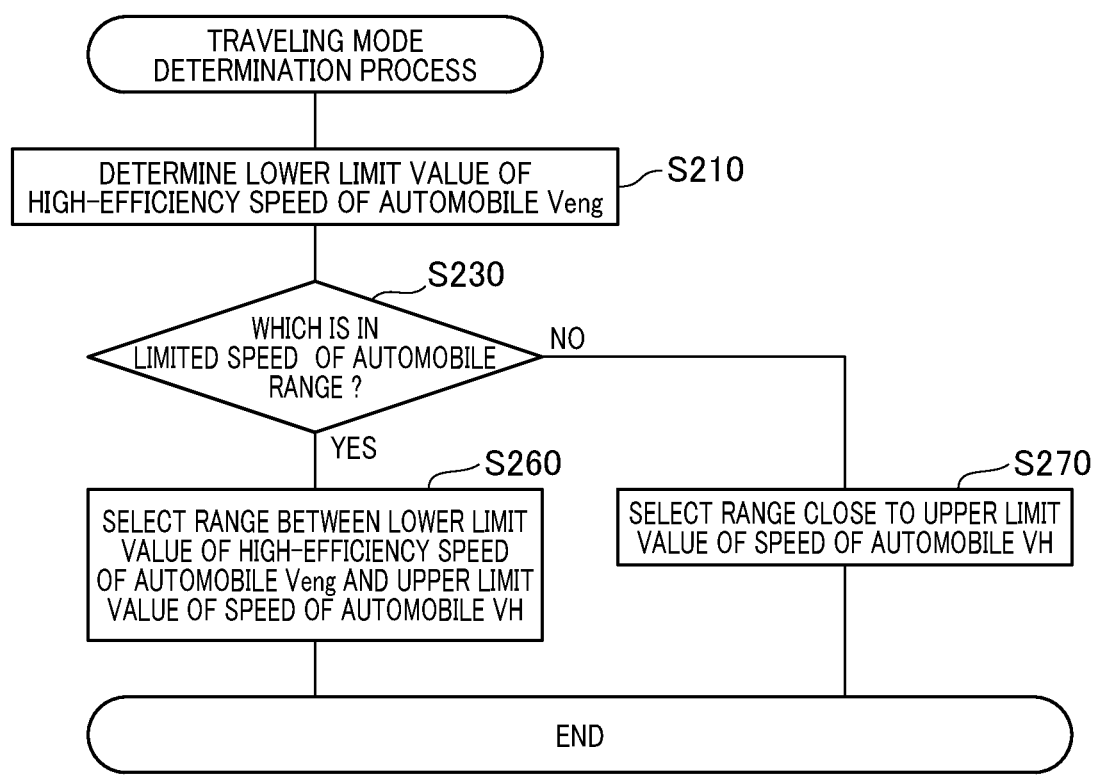
FIG. 21 is a flow chart showing a traveling mode determination process of the Third Embodiment.

As shown in FIG. 20, an automobile 33 of the third embodiment does not include an MG or devices related to the MG. Thus, as shown in FIG. 21, the traveling mode determination process included in the first planning process is a process of determining a vehicle speed range. In FIG. 21, the substantially same steps as the steps in FIG. 9 are given the same step numbers as the steps in FIG. 9.

Figure 22:
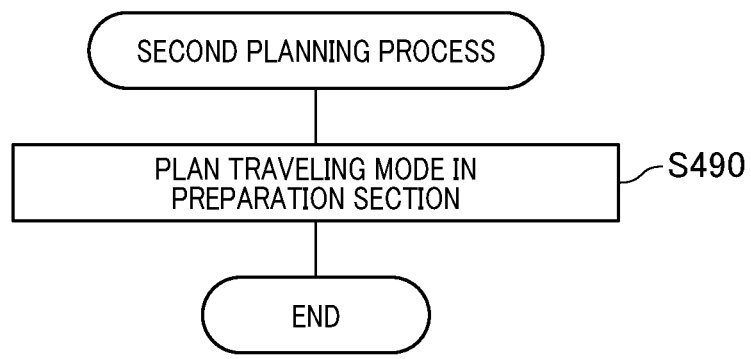
FIG. 22 is a flow chart showing a second planning process of the Third Embodiment.

As shown in FIG. 22, the second planning process of the third embodiment 3 only performs planning of the traveling mode in the preparation section. In the second planning process of the third embodiment, as the at least one parameter related to the travel, the vehicle speed is adjusted.

The ACC-ECU 13 corresponds to a travel control device, S100 corresponds to a first planning unit, S300 corresponds to a second planning unit, and S500 corresponds to a control unit.

The present disclosure is not limited to the embodiments, examples, or modified examples described herein, and can be implemented by various configurations without departing from the scope of the present disclosure. For example, the technical features in the embodiments, examples, or modified examples corresponding to the technical features in the embodiment described in the section "Summary of the Invention" may be replaced or combined as appropriate in order to solve some or all of the problems described above or to achieve some or all of the effects described above. Unless the technical features are described herein as essential elements, the technical features can be omitted as appropriate. Examples of such technical features are as below.

The default travel control does not need to be the BC control, and only needs to be control in which at least acceleration is automatically performed in some cases. For example, the default travel control may be control in which a distance from a front vehicle is maintained constant.

The restricted section does not need to be the curved road, as long as the restricted section is a section in which acceleration should be prohibited. For example, the restricted section may be a section with poor visibility, a section in front of a kindergarten, a section in which snow is accumulated, or the like. The section in which snow is accumulated may be determined, for example, on the basis of image information obtained by the camera mounted on the automobile or on the basis of a snow accumulation amount on a future route obtained based on weather information or road information.

During the power generation travel in the restricted section, control that should be performed in a high-efficiency operating condition or a stable operating condition may be performed. For example, such control may be catalyst regeneration control, filter regeneration control, or the like. The catalyst reproduction control is control for removing a substance adsorbed on or adhered to a catalyst. The filter reproduction control is control for oxidizing collected PM at a high temperature in an internal combustion engine with a PM filter.

In the above embodiments, some or all of the functions and processes implemented by software may be implemented by hardware. Furthermore, some or all of the functions and processes implemented by hardware may be implemented by software. The hardware may be, for example, various circuits such as an integrated circuit, a discrete circuit, or a circuit module in which these circuits are combined.

What is claimed is:

1. A travel control device for controlling travel of an automobile, the travel control device comprising:
a first planning unit that, in response to the automobile being predicted to enter a restricted section in which a traveling condition is restricted, plans a traveling mode satisfying the restricted traveling condition as a first traveling mode in the restricted section;
a second planning unit that plans a second traveling mode in a preparation section so as to perform the first traveling mode planned by the first planning unit, the preparation section being defined as a section extending to the restricted section before the automobile enters the restricted section, the second traveling mode adjusting a value of at least one parameter related to the first traveling mode to a preparation value appropriate for the first traveling mode; and
a control unit that controls travel of the automobile in the preparation section so as to perform the second traveling mode planned by the second planning unit,
wherein:
the automobile is a hybrid car equipped with an internal combustion engine, a motor-generator, and a battery,
the first planning unit selects power generation travel or EV travel as the first traveling mode in the restricted section, in accordance with a relationship between a limit value of a speed of the automobile for each of the power generation travel and the EV travel, and a restricted speed range satisfying the restricted traveling condition,
the power generation travel is configured to perform, based on driving power by the internal combustion engine, a first task of travelling the automobile, and a second task of causing the motor-generator to perform power generation to thereby charge the battery,
the EV travel is configured to drive, based on electrical power supplied from the battery, the motor-generator to travel the automobile while maintaining the internal combustion engine being suspended, and
the at least one parameter adjusted by the second planning unit includes a speed of the automobile and a remaining capacity of the battery.

2. The travel control device according to claim 1, wherein:
when a lower limit value of the restricted speed range is greater than an upper limit value of the speed of the automobile by the EV travel, the first planning unit selects the power generation travel as the first traveling mode.

3. The travel control device according to claim 2, wherein:
if the power generation travel is selected in a case where an upper limit value of the restricted speed range is greater than a lower limit value of a maximum-efficiency speed range of the automobile, the maximum-efficiency speed range including a speed at which operation efficiency of the internal combustion engine is maximum,
the second planning unit plans the second traveling mode in the preparation section so that a value of the speed of the automobile at a time of entry into the restricted section is within a range between the lower limit value of the maximum-efficiency speed range of the automobile and the upper limit value of the restricted speed range.

4. The travel control device according to claim 1, wherein:
if the power generation travel is selected in a case where an upper limit value of the restricted speed range is smaller than a lower limit value of a maximum-efficiency speed range including a speed at which operation efficiency of the internal combustion engine is maximum,
the second planning unit plans the second traveling mode in the preparation section so that a value of the speed of the automobile at a time of entry into the restricted section set to the upper limit value of the restricted speed range.

5. The travel control device according to claim 1, wherein:
if a lower limit value of the restricted speed range is smaller than an upper limit value of the speed of the automobile by the EV travel, the first planning unit selects the EV travel as the first traveling mode; and
when the EV travel is selected, the second planning unit plans the second traveling mode in the preparation section so that a value of the speed of the automobile at a time of entry into the restricted section is set to be equal to or more than the lower limit value of the restricted speed range and to be equal to or less than the upper limit value of the speed of the automobile by the EV travel.

6. The travel control device according to claim 1, wherein:
if the power generation travel is selected, when the sum of a current value of the remaining capacity of the battery and an increase in the remaining capacity based on charging during travel of the automobile in the restricted section is greater than an upper limit of the remaining capacity,
the second planning unit plans the second traveling mode to reduce the remaining capacity during entry into the preparation section so that the sum of the current value of the remaining capacity of the battery and the increase in the remaining capacity based on charging during travel of the automobile in the restricted section is equal to or smaller than the upper limit of the remaining capacity.

7. The travel control device according to claim 1, wherein:
if the EV travel is selected, when a subtraction, from a current value of the remaining capacity of the battery, of a reduction in the remaining capacity during travel of the automobile in the restricted section is smaller than a lower limit value of the remaining capacity,
the second planning unit plans the second traveling mode to increase the remaining capacity during entry into the preparation section so that
the subtraction, from the current value of the remaining capacity of the battery, of the reduction in the remaining capacity during travel of the automobile in the restricted section is equal to or greater than the lower limit value of the remaining capacity.

8. The travel control device according to claim 1, wherein:
when an upper limit value of the restricted speed range is greater than a lower limit value of a maximum-efficiency speed range including a speed at which operation efficiency of the internal combustion engine is maximum,
the first planning unit plans, as the first traveling mode in the restricted section, a first travel plan that sets the speed of the automobile to be equal to or more than the lower limit value of the maximum-efficiency speed range and to be equal to or less than the upper limit value of the restricted speed range;
when the upper limit value of the restricted speed range is smaller than the lower limit value of the maximum-efficiency speed range, the first planning unit plans, as the first traveling mode in the restricted section, a second travel plan that sets the speed of the automobile to the upper limit value of the restricted speed range; and
the at least one parameter adjusted by the second planning unit includes a vehicle speed.

9. The travel control device according to claim 1, wherein the restricted section is a curved road.

* * * * *